June 24, 1958     M. B. RASMUSSON     2,840,011
STICK HOLDER
Filed Sept. 21, 1956     2 Sheets-Sheet 2
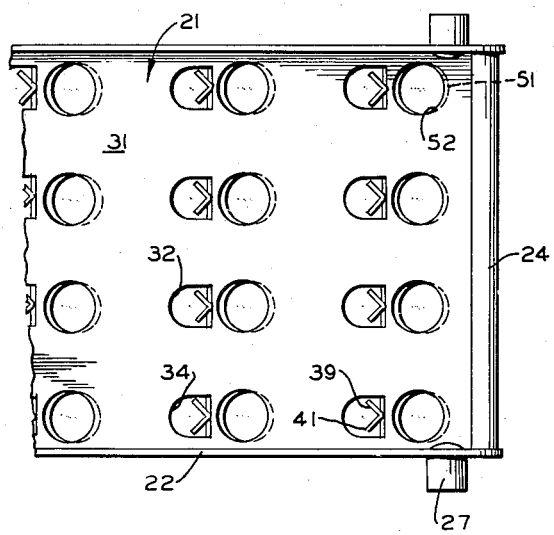
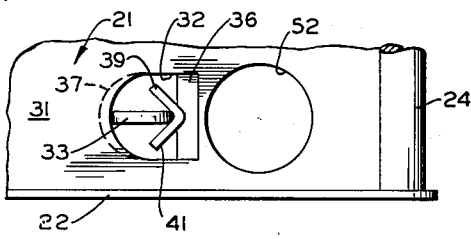
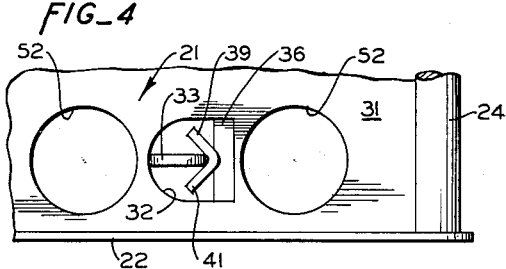
INVENTOR.
MARLIN B. RASMUSSON
BY *Lothrop & West*
ATTORNEYS

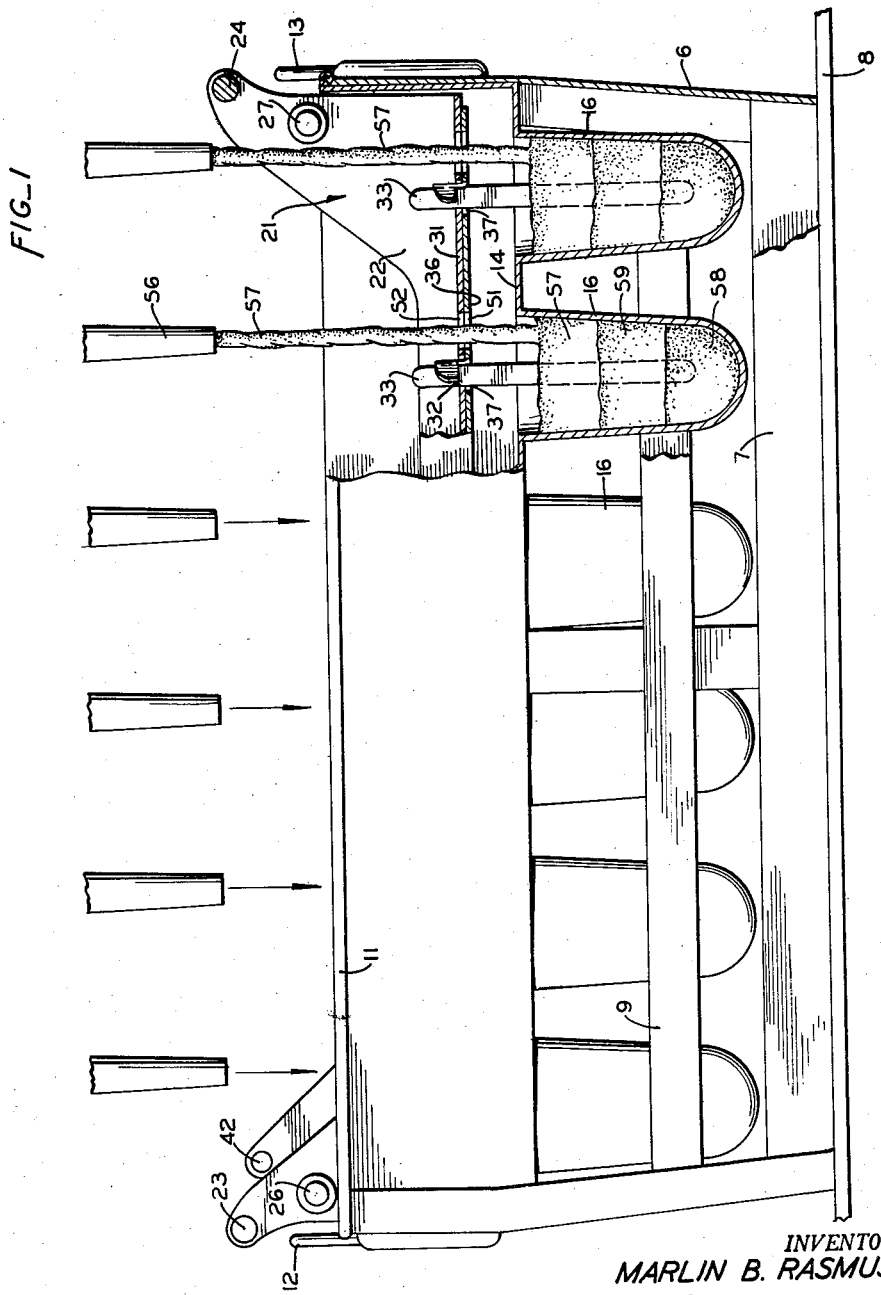

United States Patent Office 2,840,011
Patented June 24, 1958

2,840,011

STICK HOLDER

Marlin B. Rasmusson, Sacramento, Calif.

Application September 21, 1956, Serial No. 611,164

2 Claims. (Cl. 107—8)

My invention relates to means for making in quantity stick confections of the sort in which a holding stick, usually of wood, is frozen into a mass of ice cream or water ice or comparable frozen confection. In many instances, it is desirable to provide a confection which is comprised of a plurality of mixes, either mixes which vary in color or mixes which vary in flavor or both.

In the customary manufacture of frozen confections of this sort, there is utilized a metallic mold which is a generally rectangular frame having provided in it a number of mold cavities of the general size and shape of the finished confection. The number of mold cavities is usually twenty-four per mold with six of the cavities being arranged in a file and there being four rows of files per mold. The mix in liquid, unfrozen form is discharged into the cavities and subsequently a stick holder is placed on the mold. The stick holder is a device for positioning, gripping and releasing the wooden sticks. When the stick holder is put into position on the mold, the gripped sticks then depend centrally into the various subjacent mold cavities. Following the charging of the cavities with mix and the freezing thereof, the mold is separated from the frozen confections as they are suspended by their sticks from the stick holder. Ultimately, the stick holder is actuated to release the sticks and the confections are then carried along for further operations. Various standard forms of molds and stick holders are utilized. These are uniformly arranged so that the molds are first filled with liquid mix and the stick holders with the sticks therein are subsequently positioned on the mold with the sticks then depending into the liquid mix. This arrangement makes it difficult if not impossible to utilize more than one mix at a time in the mold cavities.

It is therefore an object of my invention to provide a stick holder which will permit the utilization at one time of a number of different mixes in the mold cavities.

Another object of the invention is to provide a stick holder which will permit successive mixes to be sequentially charged into the mold cavities while the stick holder is assembled with the mold.

Another object of the invention is to provide a stick holder which when assembled with the mold will permit the charging of the mold after the sticks are in place rather than before.

Another object of the invention is to provide a stick holder which, while effective to hold the sticks in position relative to a mold, will not interfere with the subsequent charging of the mold with mix.

Another object of the invention is to provide an improved stick holder.

A still further object of the invention is to provide an improved device for making frozen stick confections.

Other objects, together with the foregoing, are attained in the embodiments of the invention described in the accompanying description and illustrated in the accompanying drawings in which:

Figure 1 is a side elevation partly diagrammatic of a mold and stick holder constructed in accordance with the invention, a portion of the structure being broken away on a vertical longitudinal plane to show the mechanism in cross-section.

Figure 2 is a plan of the structure shown in Figure 1 a part of the device being broken away to reduce the size of the figure.

Figure 3 is an enlarged plan of a part of the stick holder shown in Figure 2.

Figure 4 is a view comparable to Figure 3 but showing a modified form of stick holder pursuant to the invention.

The device of the present invention is especially adaptable for use with a structure of the sort shown in my co-pending application entitled Automatic Stick-Confection Mechanism filed October 17, 1955 with Serial Number 541,012 and is also especially designed for use with a multimix structure as shown in my co-pending application entitled Confection Mix Dispenser filed September 11, 1956, with Serial Number 609,139. In those environments there is provided means for receiving and freezing the contents of a mold 6. The mold is a generally rectangular body fabricated with a base 7 designed to be supported on a conveyor 8. The mold has a skeleton framework 9 open adjacent the bottom central portion of the mold. At its top it is provided with a reinforcing band 11 and with handles 12 and 13.

The mold also includes a top plate 14 which is substantially continuous and extends from end to end of the mold. A plurality of mold cavities 16 depend from the top plate 14. These preferably merge quite smoothly with the plate 14 and are of the size and configuration of the ultimately desired frozen confection. The cavities 16 are preferably arranged in rows of six, as seen in Figure 1, and preferably four rows of files are provided transversely of the mold, as seen in Figure 2. The walls of the cavities 16 are preferably of good thermally conducting materials so that the heat of the contents of the mold can readily be dissipated through the cavity walls. While the mold described is a typical one of the standard sort now used, the mold can vary substantially from the present shape and configuration without departing from the present invention.

Designed to fit within the confines of the mold above the top plate 14 therein is a stick holder 21. This is described in connection with a standard mold although the design of the stick holder can vary somewhat in accordance with variations in mold configurations. The stick holder 21 includes a framework 22 having handles 23 and 24 at its opposite ends designed to be disposed adjacent the handles 12 and 13 when the stick holder is in position within the mold. The frame 22 adjacent the handles is provided with projecting pins 26 and 27 resting upon the reinforced edge 11 of the mold to sustain the stick holder in position with slight lateral and end play.

The stick holder frame 22 includes a first or top plate 31. This is preferably a substantially continuous or solid metal flat sheet extending from side to side of the stick holder and from end to end thereof. At each of various locations disposed substantially centrally above the various subjacent cavities 16, the top plate 31 is pierced to provide one of a series of first apertures 32 slightly larger than the dimensions of the sticks 33 which pass therethrough. The edge 34 of each of the first apertures 33 engages the relatively soft wood (usually) of the standard stick without substantially deforming the material.

Adapted to move within the stick holder 21 relative to the first or top plate 31 is a second bottom movable plate 36. This plate also is preferably substantially a continuous sheet of flat metal extending from side to side of the stick holder and from end to end thereof. The bottom sheet is likewise provided with a number of second apertures 37 therein approximately registering with the first apertures 32. Conveniently the material which is struck out to form the second apertures is deformed and bent to provide upstanding wings 39 and 41 forming in plan a V-shaped gripping structure extending upwardly through the apertures 32. The bottom of the V-shape formed by the wings 39 and 41 is effective to abut the opposite side of one of the sticks 32.

When the bottom plate 36 is shifted with respect to the top plate 31 into gripping position, the sticks 33 are gripped on one side by the edges of the apertures 32 in the top plate and are gripped on the other side by the upstanding members 39 and 41 forming part of the bottom plate 36. When the bottom plate 36 is shifted to the right in Figure 1, the sticks 33 are released. In order to shift the bottom plate relative to the top plate, there is provided an actuating lever 42. This is connected in any convenient way (not shown) to actuate and hold the top and bottom plates for gripping or for releasing the sticks in any of several well known manners.

The stick holder as so far described is substantially a standard item of commerce and varies in detailed construction from time to time but in general is characterized by the provision of a pair of superposed relatively slidable continuous or solid plates which can be mounted in a mold and which can be actuated to grip or to release a plurality of sticks depending from the stick holder into subjacent mold cavities.

In accordance with the invention I preferably provide means for departing from the usual scheme of first filling the mold cavity 16 with a liquid mix and subsequently placing a stick holder with depending sticks gripped therein onto the mold with the sticks depending into the mold cavities. Pursuant to the present invention, the stick holder bottom plate 36 is provided with a number of first openings 51 preferably circular in configuration and disposed alongside of or adjacent the stick holding means in that plate and in vertical alignment or registry with each of the subjacent mold cavities 16 when the stick holder is in position. The top stick holder plate 31 is provided with a number of second openings 52 also conveniently circular in configuration and designed substantially to register with the openings 51 when the stick holder is in stick gripping position. The through passages in the plates 31 and 36 thereby afford access from above the stick holder to the mold cavities.

When mix nozzles 56 are positioned relatively to the stick holder and mold as shown in Figure 1 and a stream 57 of mix is released therefrom, the mix passes through the registering openings 51 and 52 and flows into the mold cavities 16 even though the stick holder and the sticks are already in position. If desired, the mold cavities can be entirely filled with a single mix but in most circumstances it is desired merely to fill the mold cavities 16 say, one third full with a mix 58 of one nature, either one color or one flavor. The stream 57 is then interrupted and in subsequent station other nozzles provide a mix 59 for a subsequent one-third of the mold cavities, this mix 59 being preferably of a different color or flavor.

Finally, in a subsequent station, an additional mix is provided to fill the cavity with material of different color or flavor. Usually the first mix is partially or entirely frozen before the second mix is added but in any case the important factor is that the mix is added to the mold cavity after the stick holder and sticks have been initially positioned. With openings through the stick holder plates it is possible to charge the mold after the stick holders have been put into position and to charge the same cavities repeatedly with different mixes if desired. After the mix has been frozen and the mold has been withdrawn the stick holder is left with depending sticks having confections of multimix material frozen thereon. The stick holders are readily discharged, cleaned and returned for subsequent use in the customary way. They are operated to engage and disengage their sticks in the standard fashion yet permit a ready loading of the confection molds after the stick holders are in position thereon.

What is claimed is:

1. For use with a confection mold having a mold cavity therein, a stick holder adapted to be supported on said mold, a first plate on said stick holder having a stick-receiving first aperture therein substantially centered over said mold cavity with an edge of said first plate bounding said first aperture engageable with a stick passing through said aperture, a second plate on said stick holder having a stick-receiving second aperture therein substantially centered over said mold cavity, said second plate being slidably movable relative to said first plate into a predetermined position with an edge of said second plate bounding said second aperture engageable with said stick, and means providing openings in said first plate and said second plate adjacent said first and second apertures and overlying said mold cavity, said openings registering when said second plate is in said predetermined position.

2. A stick holder adapted to be used on a confection mold having a predetermined configuration in plan and having a plurality of cavities opening upwardly and within the confines of said configuration comprising a lower planar plate having substantially said predetermined configuration and overlying all of said cavities, an upper planar plate having substantially said predetermined configuration and overlying all of said cavities, means for mounting said plates on said mold, means for interconnecting said plates for relative sliding movement between a first position and a second position, means providing apertures in said plates in locations to register with each other and freely to pass confection sticks centered in said cavities when said plates are in said first position and to be out of register with each other and to grip said confection sticks when said plates are in said second position, and means providing openings in said plates in locations to register with each other and to overlie respective ones of said cavities when said plates are in said second position and to be out of register with each other when said plates are in said first position.

References Cited in the file of this patent
UNITED STATES PATENTS

| | | |
|---|---|---|
| 1,893,513 | Balian | Jan. 10, 1933 |
| 2,131,446 | Loewenstein | Sept. 27, 1938 |
| 2,172,183 | Thomas | Sept. 5, 1939 |
| 2,203,239 | Slee | June 4, 1940 |
| 2,232,196 | Anderson | Feb. 18, 1941 |

FOREIGN PATENTS

| | | |
|---|---|---|
| 48,326 | Denmark | Jan. 29, 1934 |